(12) United States Patent
Chen

(10) Patent No.: US 6,886,851 B2
(45) Date of Patent: May 3, 2005

(54) STROLLER

(75) Inventor: Shun-Min Chen, Taipei (TW)

(73) Assignee: Kenny Cheng (TW)

( * ) Notice: Subject to any disclaimer, the term of this patent is extended or adjusted under 35 U.S.C. 154(b) by 71 days.

(21) Appl. No.: 10/391,096

(22) Filed: Mar. 18, 2003

(65) Prior Publication Data

US 2004/0183275 A1 Sep. 23, 2004

(51) Int. Cl.$^7$ ................................................. B62B 7/06
(52) U.S. Cl. ..................... 280/642; 280/650; 280/47.38
(58) Field of Search ................................. 280/638, 639, 280/38, 641, 642, 643, 647, 650, 657, 658, 47.34, 47.38, 47.371; 297/16.1, 31, 46

(56) References Cited

U.S. PATENT DOCUMENTS

| | | | | |
|---|---|---|---|---|
| 5,769,447 A | * | 6/1998 | Huang | 280/642 |
| 5,823,564 A | * | 10/1998 | Kettler | 280/642 |
| 5,979,928 A | * | 11/1999 | Kuo | 280/642 |
| 6,062,587 A | * | 5/2000 | Cabagnero | 280/642 |
| 6,464,244 B1 | * | 10/2002 | Cheng | 280/650 |
| 6,485,216 B1 | * | 11/2002 | Cheng | 403/102 |
| 6,530,591 B2 | * | 3/2003 | Huang | 280/650 |
| 6,533,310 B2 | * | 3/2003 | O'Shea et al. | 280/644 |
| 6,692,015 B2 | * | 2/2004 | Perego | 280/647 |
| 6,739,616 B2 | * | 5/2004 | Lin | 280/642 |

* cited by examiner

Primary Examiner—Christopher P. Ellis
Assistant Examiner—Brian Swenson
(74) Attorney, Agent, or Firm—Gauthier & Connors LLP

(57) ABSTRACT

A novel collapsible stroller is provided. The stroller includes a handle having two arm tubes, an actuating means operablely mounted on the handle, two front leg tubes, two rear leg tubes, two connecting tubes one end of each of these tubes being pivotally coupled to one of the arm tubes respectively via a pivot locking means which is operablely connected to the actuating means via a cable so as to selectively lock/unlock the stroller and allow the handle to be folded forward and allow the stroller to collapse to a compact collapsed state with a more comfortable user posture and ergonomics way.

7 Claims, 10 Drawing Sheets

STROLLER

FIELD OF THE INVENTION

The present invention relates generally to a stroller and more particularly, to a forward collapsible stroller.

BACKGROUND OF THE INVENTION

In baby's products, strollers are mostly used products for taking baby to the outdoors. Further, in order to facilitate storage and carriage conventional strollers are usually designed as vertically and/or sidewayly collapsible strollers. Still, there are drawbacks in conventional collapsible strollers. For instance, while folding a conventional collapsible stroller the handle of the stroller is pushed backward and downward and the seat portion collapses to the wheels. However, this collapsing design is not quite ergonomics and causes inconvenience while folding the stroller. In addition, while the conventional collapsible stroller is in a folded state components of the stroller, especially the handle, are unable to compactly stacked together and thus still occupy a large space. Therefore, even in a folded state conventional, foldable strollers are inconvenient to carry for a user and they require a large space during storage and transportation.

Therefore, in the field of baby stroller there is a need for a stroller allows the user to fold the stroller with a comfort posture and a simple operation and occupies a minimum space in a folded state.

SUMMARY OF THE INVENTION

Accordingly, one object of the present invention is to provide a collapsible ergonomics stroller, which can be folded by folding the handle forward.

Another object of the present invention is to provide a collapsible stroller, which occupies a minimum space while it is in a folded state.

Still another object of the present invention is to provide a collapsible stroller, whose dying tray will not hit the ground while the stroller is claspin.

Additional features and advantages of the present invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, the stroller includes a handle (10) having two arm tubes (11); an actuating means (14) operably mounted on the handle; two pivot locking means (20) mounted to a free end of the two arm tubes respectively and connected to the actuating means via a cable; two front leg tubes (30) one end of each of the tubes being pivotally coupled to a corresponding one of the pivot locking means respectively and the other end being provided a front wheel; two rear leg tubes (40) one end of each of the tubes being pivotally coupled to one of the front leg tubes at a position proximate to the front wheel respectively and the other end being provided a rear wheel; two connecting tubes (50) one end of each of the tubes being pivotally coupled to one of the pivot locking means respectively and the other end being pivotally coupled to one of the rear leg tubes; two substantially "⌐" shaped swinging pins (51) each rotatably mounted to a connecting tube respectively; a substantially U-shaped seat tube (60) having two arm portions each respectively coupled to a connecting tube via the swinging pin; and a tray assembly (70) mounted to free ends of the arm portions of the seat tube and pivotally coupled to the front leg tubes, thereby the pivot locking means may selectively lock the stroller in a erected position where the handle is substantially parallel to the front leg tubes and the connecting tubes is substantially perpendicular to the ground, or unlock the stroller to allow the handle to be forwardly and downwardly folded and make the handle, the front leg tubes, the rear leg tubes, connecting tubes, seat tube, and the tray assembly to collapse to a folded position.

It is to be appreciated that both the forging general description and the following detailed description are exemplary and explanatory and are intended to provide further explanations of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 1:
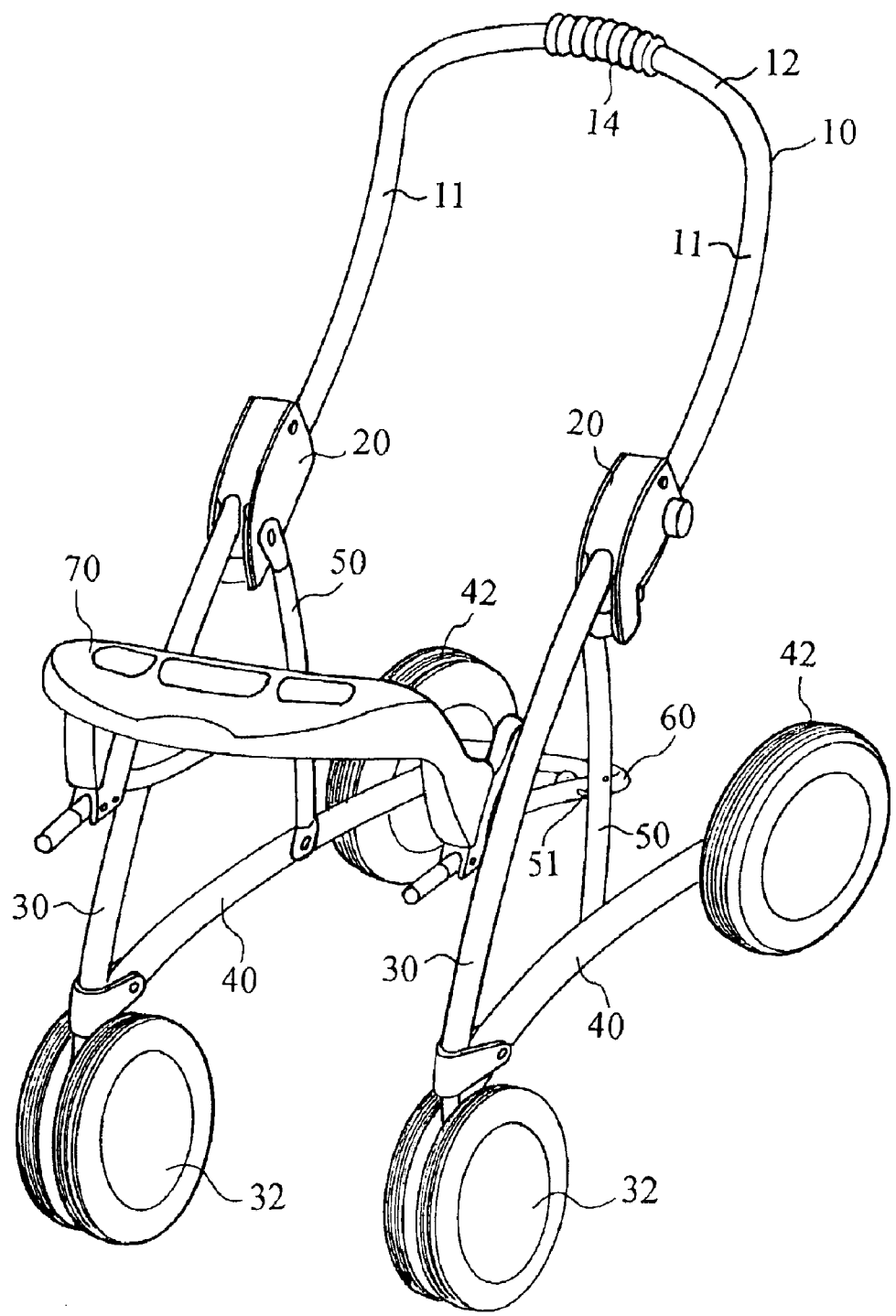
FIG. 1 is an illustrative perspective view of a stroller according to the present invention.

Referring now to FIG. 1, a stroller according to one embodiment of the present invention includes a substantially U-shaped handle 10 having two arm tubes 11 connected by a connecting portion 12; two pivot locking means 20 mounted on a free end of the two arm tube 11 respectively; two front leg tubes 30, each pivotally coupled to a corresponding pivot locking means 20 at one end and a front wheel 32 is provided at the other end respectively; two rear leg tubes 40, one end of each of the tubes being pivotally coupled to one of the front leg tubes 30 at a position proximate to the front wheel respectively and the other end being provided a rear wheel 42; two connecting tubes 50, one end of each of the tubes being pivotally coupled to one of the pivot locking means 20 respectively and the other end being pivotally coupled to one corresponding rear leg tubes; a substantially U-shaped seat tube 60 having two arm portions respectively coupled to the connecting tubes 50 via a swinging pin 51; and a tray assembly 70 mounted to a free end of the arm portions of the seat tube 60 and pivotally coupled to the front leg tubes.

An actuating member 14 is provided on the connecting portion 12 of the handle 10 and is operable relative to the handle 10. The actuating member 14 is connected to the pivot locking means 20 via a cable 16 (see FIG. 2A) so as to actuate to pivot locking means 20, and this will be described in detail in the following. In addition, the structure of the actuating member 14 and the structural relationship among the actuating member 14, the handle 10 and the cable 16 can be any form that exists in the convention stroller and thus will not be described in this specification in detail.

Figure 2A:
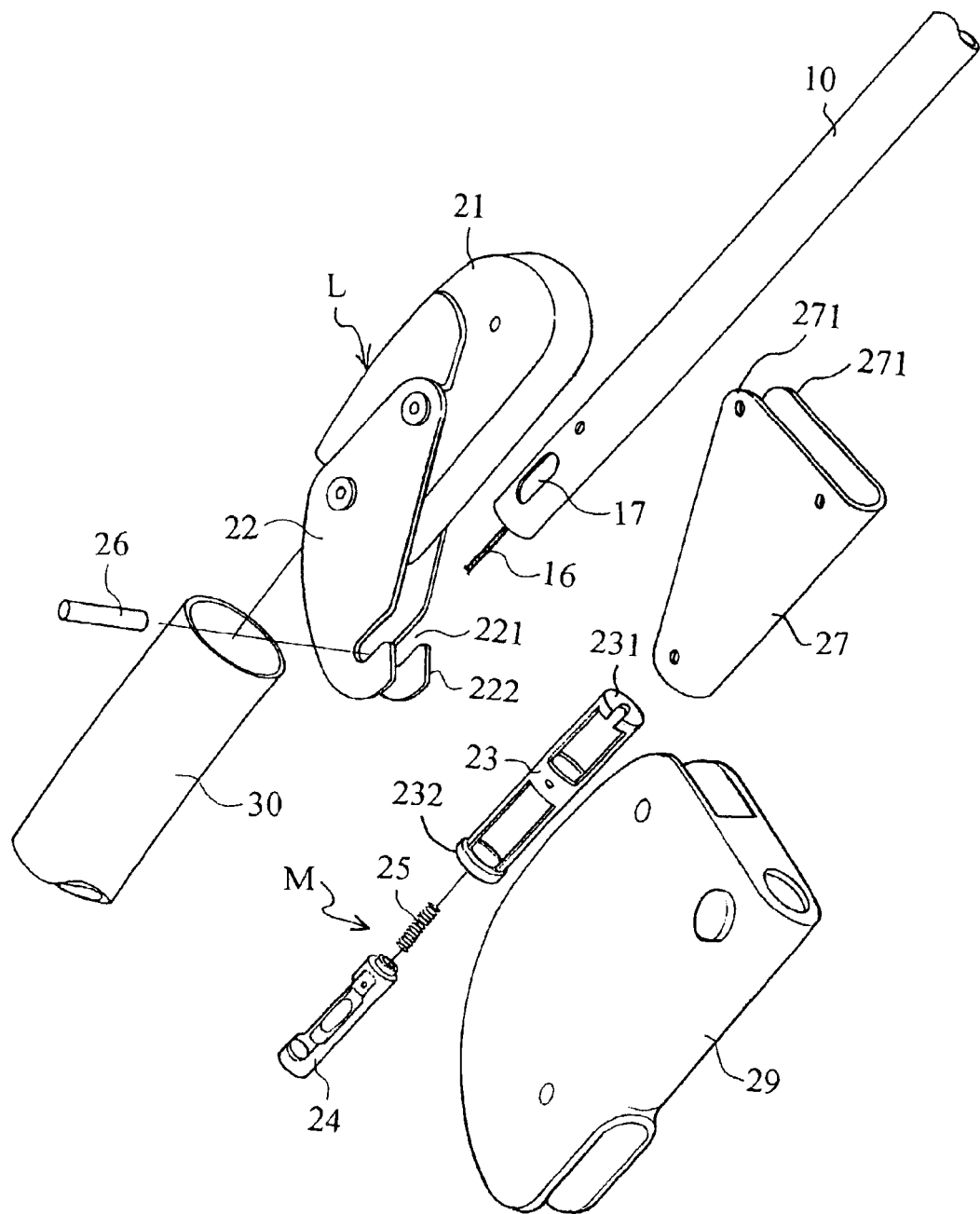
FIG. 2A is an exploded perspective view of the pivot locking means of the stroller shown in FIG. 1.
Figure 2B:
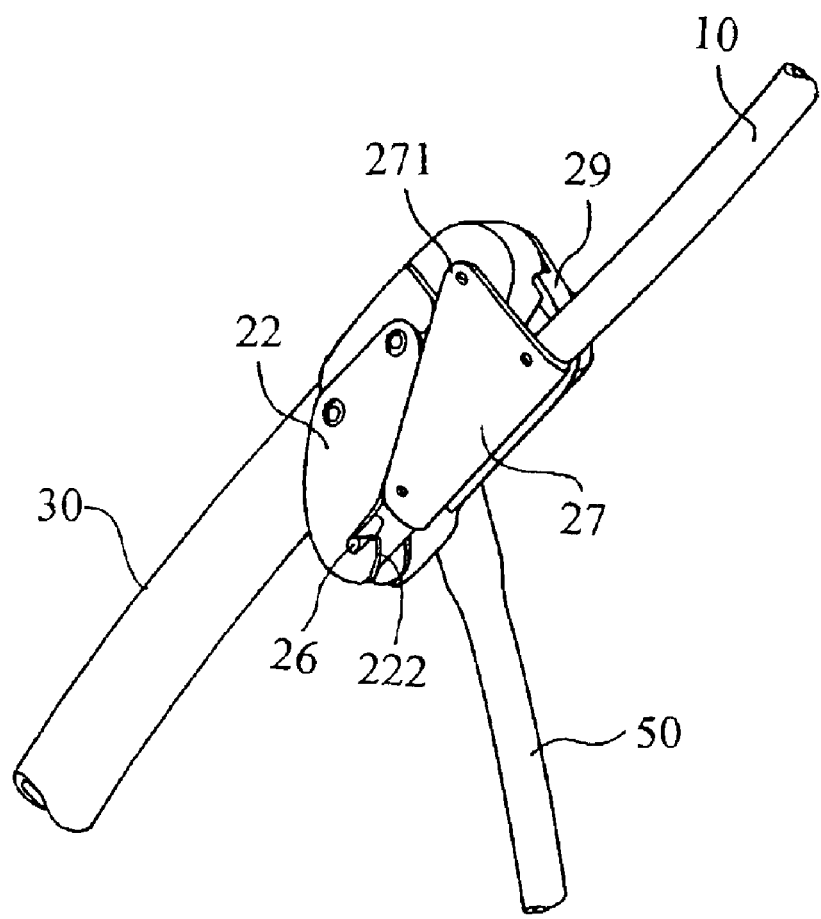
FIG. 2B is an assembled perspective view of the pivot locking means shown in FIG. 2A.

Referring now to FIG. 2A and 2B to describe pivot locking means 20. As illustrated in FIGS. 2A and 2B, the pivot locking means 20 includes a locking portion L which is mounted to the front leg tube 30, a latching portion M which is slidably installed in the arm tube 11 of the handle 10, a connecting member 27 and a protecting cap 29. The locking portion L includes a mounting member 21, which is mounted to one end of the front leg tube 30, two hook member 22 respectively disposed at either side of the mounting member 21. The mounting member 21 and the hook members 22 are coupled to the front leg tubes 30 via fasteners, such as rivets. The hook member 22 has notch 221 formed at one side thereof and a hook with a slanted face 222. The latching portion M includes a hollow cylindrical seat 23 which is fixedly mounded in the free end of the arm tube 11 of the handle 10. The seat 23 has a bottom 231, a sidewall having longitudinal slots formed therein, and a top 232 having a diameter greater than the inner diameter of the arm tube 11 of the handle 10 to prevent the seat 23 from sliding into the arm tube 11. The latching portion M further includes a sliding member 24 which is slidably disposed in the seat 23 and connected to the actuating member 14 via the cable 16, a return spring 25 disposed between the sliding member 24 and the bottom 231 of the seat 23, a pin 26 transversely passing through the sliding member 24 and extending out of the arm tube 11 through a longitudinal opening 17 formed in the arm tube 11. The connecting member 27 is a substantially triangle member with a substantially U-shaped cross-section. The sidewalls of the U-shaped connecting member 27 are fixed to free ends of the arm tubes 11 of the handle 10. The connecting member 27 is also pivotally coupled to the mounting member 21 at an apex 271 such that the handle 10 and the front leg tube 30 are pivotally coupled. The protecting cap 29 is also a substantially U-shaped member which encloses the locking portion L, latching portion M and connecting member 27 therein while it is pivotally coupled to the mounting member 21 at an upper end and pivotally coupled to the connecting tube 50 (see FIG. 2B). When the pivot locking means 20 is assembled, as shown in FIG. 2B, both end of the pin 26 extend out of the tube wall at the free end of the arm tube 11 and into the notch 221 of the hook member 22 and engage therewith, wherein in order to clearly illustrate the relationship among the components of the pivot locking means 20, a portion of the protecting cap 29 is removed.

Figure 3A:
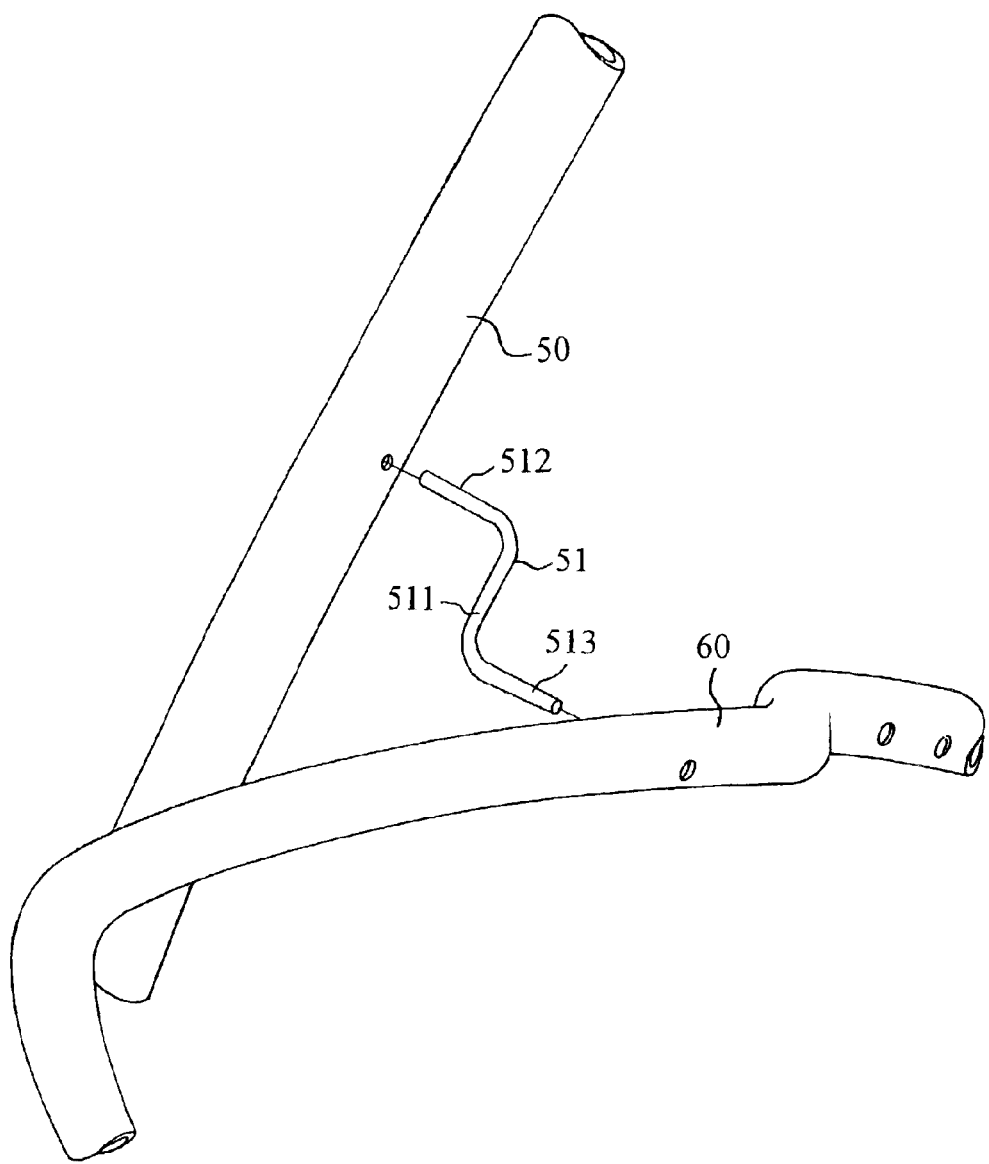
FIG. 3A is an exploded perspective view showing the swinging pin, the connecting tube and the seat tube.
Figure 3B:
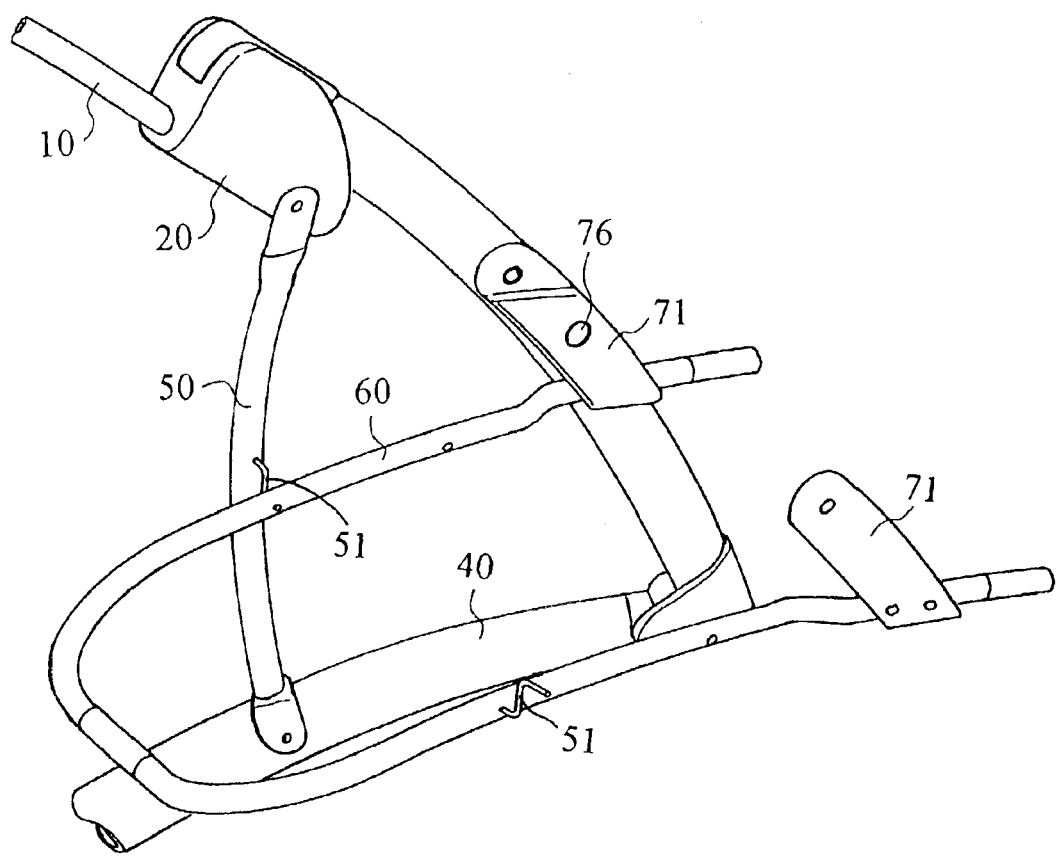
FIGS. 3B and 3C are assembled perspective views showing the relationship between the swinging pin, the connecting tube and the seat tube while at an erected and folded position respectively.
Figure 3C:
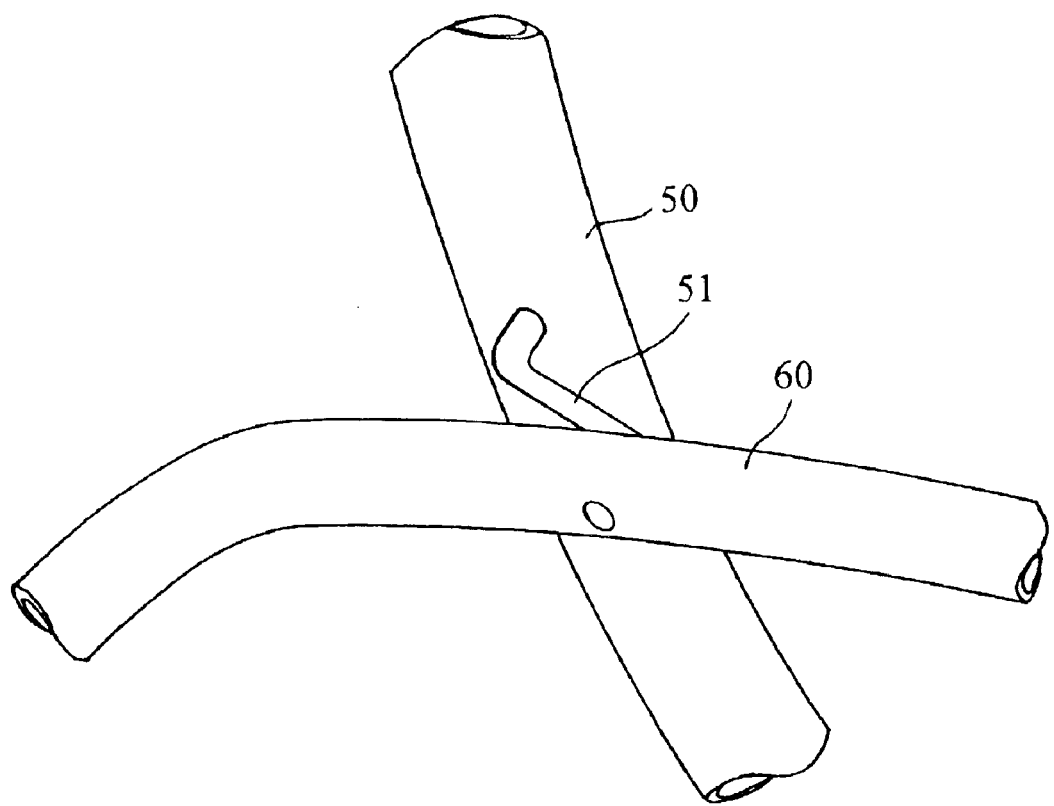

Referring now to FIGS. 3A–3C to describe the connecting relationship among the handle tube 10, the connecting tubes 50 and the seat tube 60. As shown in FIG. 3A, a swinging pin 51 is provided to swingingly couple the connecting tube 50 and the seat tube 60. The swinging pin 51 is a substantially "ㄣ" shaped member and has a middle portion 511, a first arm 512 formed at one end of the middle portion 511 and extending in a direction perpendicular to the middle portion 511, and a second arm 513 formed at the other end of the middle portion 511 and extending in a direction on the same plane of the first arm 512 yet opposite thereto. As shown in FIG. 3B, one end of the connecting tube 50 is pivotally coupled to the connecting member 27 of the pivot locking means 20 and the other end is pivotally coupled to the middle of the rear ltg tube 40. The swinging pin 51 is rotatably mounted to the connecting tube 50 by transversely passing the first arm 512 through the connecting tube 50 and mounted thereto. Then, the second arm 513 of the swinging pin 51 is transversely passed through the arm portion of the seat tube 60 to thereby swingingly coupling the seat tube 60 to the connecting tube 50. When the stroller is operated to collapse from an erected position to a collapsed position, the swinging pin 51 will rotate from an upright position (as shown in FIG. 3B) to a slanted position (as shown in FIG. 3C).

Figure 4A:
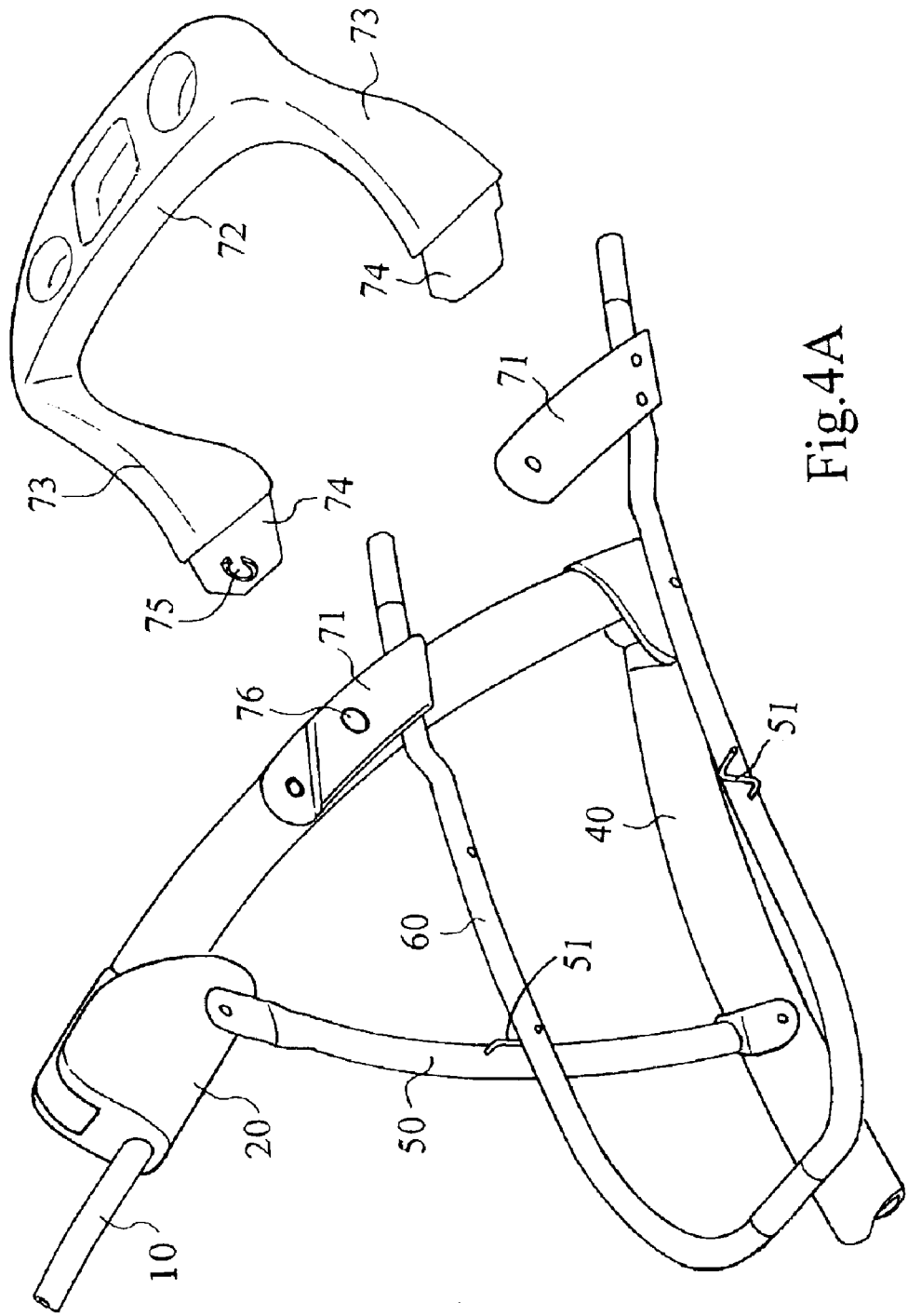
FIG. 4A is an exploded perspective view illustrating the tray assembly.
Figure 4B:
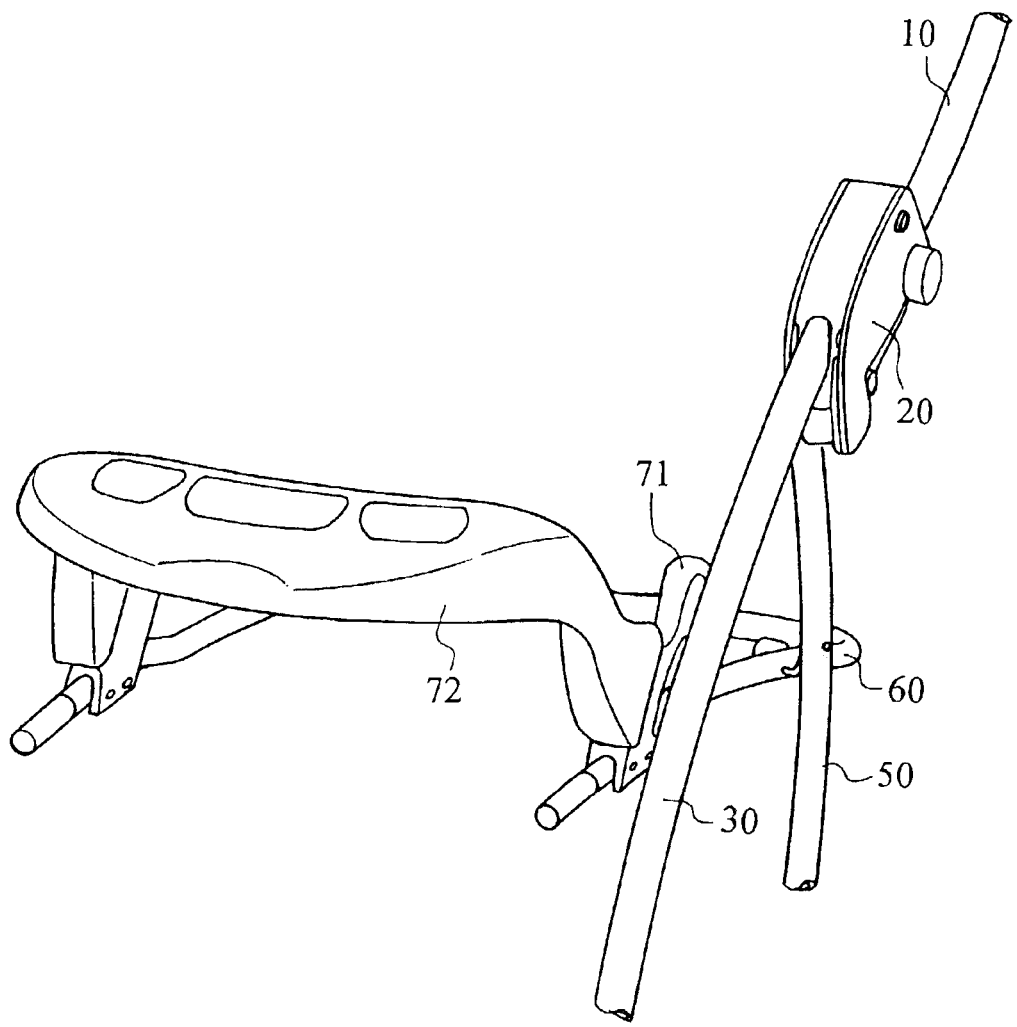
FIG. 4B is a perspective view showing the assembled tray assembly.

Referring now to FIG. 4A and 4B to describe the tray assembly 70. As shown in FIG. 4A, the tray assembly 70 includes two mounting pieces 71 each being mounted to a free end of the arm portion of the seat tube 60 at a lower portion thereof, and a tray 72 having two coupling arms 73 for removably coupling to the mounting pieces 71. Each of the mounting pieces 71 has a substantially reversed U-shaped groove provided therein for receiving a corresponding reversed U-shaped connecting portion 74 formed at the coupling arm 73 of the tray 72. A resilient locking member 75 is formed on the connecting portion 74 which will engage with a corresponding locking opening 76 formed in the mounting piece 71 while the connecting portion 74 being inserted into the corresponding U-shaped groove so as to couple the tray 72 to the mounting piece 71. When the tray 72 needs to be removed, the resilient locking member 75 will be pressed to make it disengages with the opening 76 and the tray 72 is separated from the mounting piece 71 and may be removed therefrom. Furthermore, Each of the mounting pieces 71 is pivotally coupled to a front leg tube 30 via a rivet passing through its upper portion.

Because the coupling structures between the front wheels 32 and front leg tube 30, and between the rear wheels 42 and the rear leg tube 40 are well known in this art and are not inventive features of the present invention and thus will not be described in this specification.

Figure 5A:
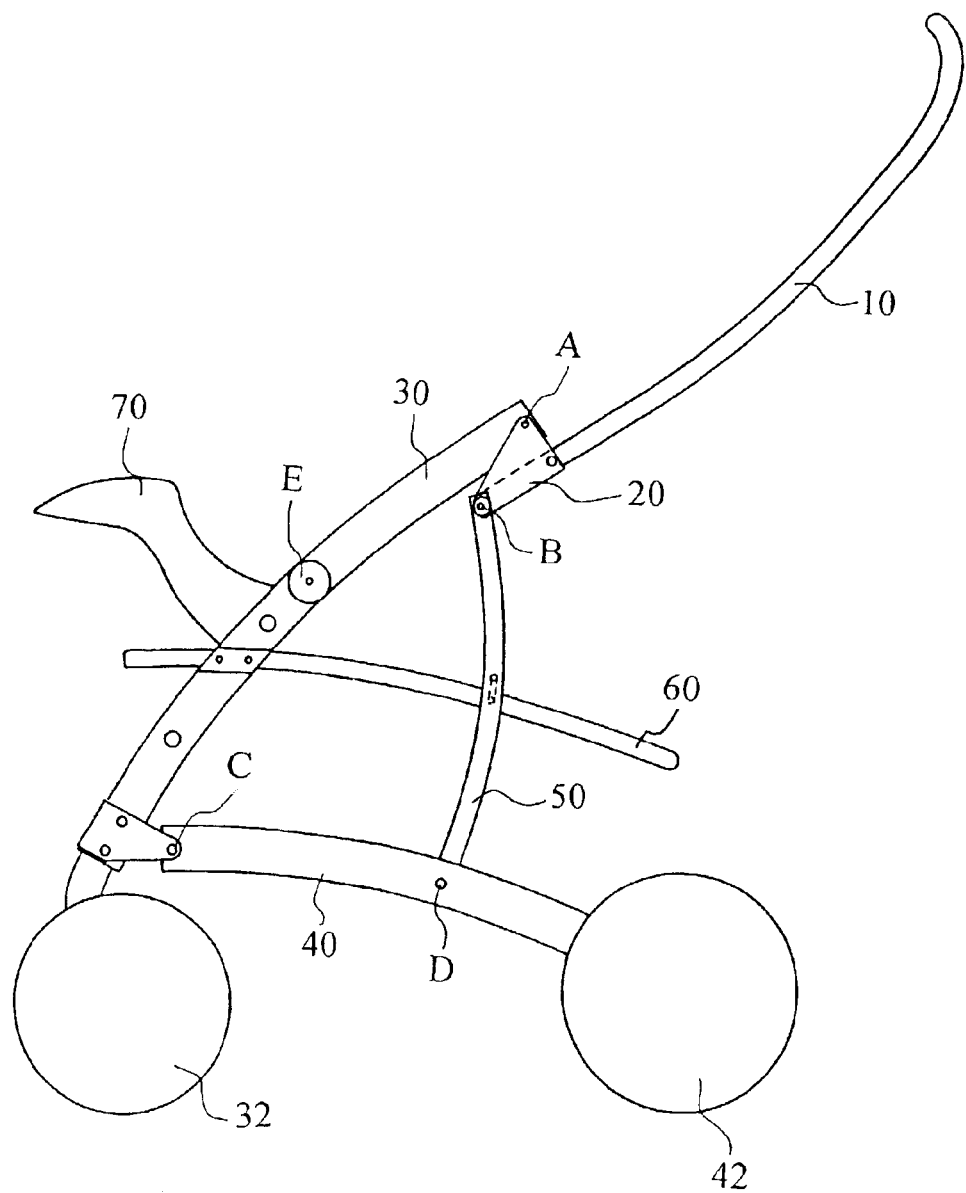
FIG. 5A is a side plane view showing the stroller according to the present application at the erected position.
Figure 5B:
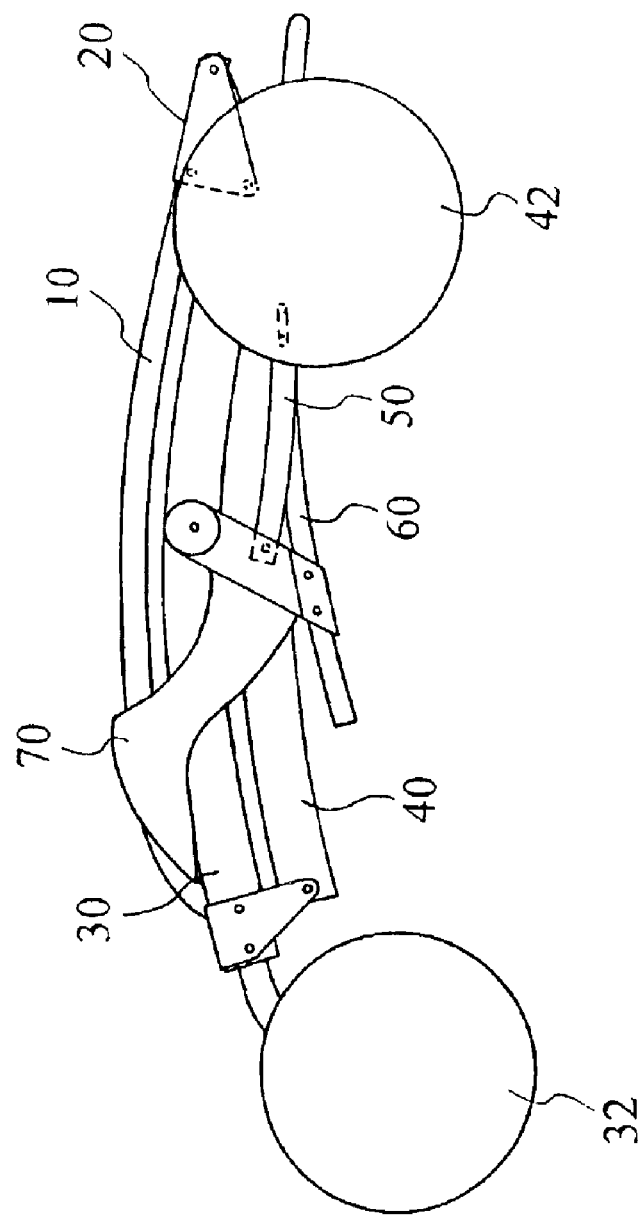
FIG. 5B is a side plane view showing the stroller according to the present application at the folded position.

Referring now to FIGS. 5A and 5B to describe the operation of the stroller of the present invention. While need to collapse the stroller of the present invention, a user only needs to operate the actuating member 14 on the handle 10 which in turn pulls the sliding member 24 of the pivot locking means 20 via the cable 16 to cause the pin 26 to move out of the notch 221 and disengage with the hook member 22. While in this disengagement state, the user may push the handle 10 forward to cause the handle 10 pivots about a point A (i.e., the point where the front leg tube coupled to the pivot locking means 20) and rotate relative to the front leg tube 30, and this in turn cause a pivot point B between the handle 10 and the connecting tube 50 pivot rearwardly. This rearward pivotal movement of the pivot point B will cause the connecting tube 50 to move backward relative to the seat tube 60 via the swinging pin 51 (as illustrated in FIG. 3C). In the meantime, the stroller loses connecting tubes' vertical support and cause front leg tubes 30 will rearwardly and downwardly pivot about a point C, and the connecting tubes 50 will rearwardly and downwardly pivot about a point D, and thereby allowing the handle 10, the front leg tubes 30, connecting tubes 50, seat tube 60 and rear leg tubes 40 to collapse to a collapsed state where the handle 10, the front leg tubes 30, connecting tubes 50, seat tube 60 and rear leg tubes 40 are substantially parallel to each other. The tray assembly 70 will pivot about a point E located between the mounting piece 71 and the front leg tube 30 to avoid hitting the ground, as shown in FIG. 5B.

When need to erect the stroller, the user only needs to lift up the handle 10 and then the front leg tubes 30 and connecting tubes 50 will be caused to pivot upwardly and forwardly about point C and point D respectively. This will in turn make the swinging pin 51 swings forward to a substantially upright position (see FIG. 3B) and the handle 10 will pivot about point A to a position where the arm tubes of the handle are substantially parallel to the front leg tubes 30. At this state, the user only needs to slightly push the handle 10 downwardly and backwardly, and then the pin 26 of the pivot locking means 20 will engage with the hook member 22 and move along the slanted face 222 and into the notch 221 so as to lock the stroller in an erected position, as shown in FIG. 5A.

The stroller of the present invention may achieve following advantages:

(1) The stroller may be folded in an ergonomics way such that the user may fold the stroller with a more comfortable posture;

(2) While folding the stroller, the tray assembly will not hit the ground because of the collapsing motion of the body of the stroller; and (3) While in the folded state, the length of the stroller may be minimized because the handle is folded onto and overlapped with the front leg tubes and rear leg tubes. Moreover, because the tray assembly may pivot inward relative to the front leg tubes during folding, the overall height of the stroller in folded state may be minimized.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A stroller comprising:

a handle having two arm tubes;

an actuating means operably mounted on the handle;

two pivot locking means mounted to a free end of the two arm tubes respectively and connected to the actuating means via a cable; and two front leg tubes one end of each of the tubes being pivotally coupled to a corresponding one of the pivot locking means respectively and the other end being provided a front wheel, wherein the pivot locking means includes a locking portion, which is mounted to the front leg tube, a latching portion which is slidably installed in the arm tube of the handle and is operably coupled to the actuating means via the cable so as to selectively engage/disengage with the locking portion, a connecting member which nivotally counsel the handle to the locking portion, and a protecting cap which encloses the lacking portion, the latch portion, and the connecting member therein; and wherein the locking portion includes a mounting member, which is mounted to one end of the front leg tube, two hook members respectively disposed at either side of the mounting member, wherein each of the hook members has a hook with a slanted face and a notch formed at one side thereof.

2. A stroller as claimed in claim 1, wherein the handle is a substantially U-shaped tube member having a connection portion connecting the two arm tubes and the actuating means is mounted to the connection portion.

3. A stroller as claimed in claim 1, wherein the latching portion includes a hollow cylindrical seat, which is fixedly mounded in the free end of the arm tube of the handle and has a bottom, a sidewall having longitudinal slots formed therein, and a top having a diameter greater than the inner diameter of the arm tube of the handle to prevent the seat from sliding into the arm tube; a sliding member which is slidably disposed in the seat and connected to the actuating member via the cable, a return spring disposed between the sliding member and the bottom of the seat, a pin transversely passing through the sliding member and extending out of the arm tube to selectively engage/disengage with the hook members.

4. A stroller as claimed in claim 1, further comprising:

two rear leg tubes one end of each of the tubes being pivotally counted to one of the front leg tubes at a position proximate to the front wheel respectively and the other end being provided a rear wheel;

two connecting tubes one end of each of the tubes being pivotally coupled to one of the pivot locking means respectively and the other end being pivotally counted to one of the rear leg tubes;

two swinging pins each rotatably mounted to a connecting tube respectively;

a substantially U-shaped seat tube having two arm portions each respectively coupled to a connecting tube via the swinging pin; and a tray assembly mounted to free ends of the arm portions of the seat tube and pivotally counted to the front leg tubes, thereby the pivot locking means may selectively lock the stroller in an erected position where the handle is substantially parallel to the front leg tubes and the connecting tubes is substantially perpendicular to the ground, or unlock the stroller to allow the handle to be forwardly and downwardly folded and make the handle, the front leg tubes, the rear leg tubes, connecting tubes, seat tube, and the tray assembly to claps to a folded position.

5. A stroller as claimed in claim 1, wherein the latching portion includes a spring member fixedly disposed in the free end of the arm tube of the handle; a sliding member slidably disposed in the free end of the arm tube against the spring member and connected to the actuating member via the cable; and a pin transversely passing through the sliding member and extending out of the arm tube to selectively engage/disengage with the hook members.

6. A stroller as claimed in claim 4, wherein the swinging pin has a middle portion, a first arm formed at one end of the middle portion and extending in a direction perpendicular to the middle portion, and a second arm formed at the other end of the middle portion and extending in a direction on the same plane of the first arm yet opposite thereto.

7. A stroller as claimed in claim 4, wherein the tray assembly includes two mounting pieces each being mounted to a free end of the arm portion of the seat tube at a lower portion thereof and pivotally coupled to the front leg tube at an upper portion thereof, and a tray having two coupling arms for removably coupling to the mounting pieces.

* * * * *